US012005395B2

(12) United States Patent
Hilbrecht et al.

(10) Patent No.: US 12,005,395 B2
(45) Date of Patent: Jun. 11, 2024

(54) REVERSE OSMOSIS SYSTEM

(71) Applicant: Danfoss A/S, Nordborg (DK)

(72) Inventors: Lars Bjarne Hilbrecht, Nordborg (DK); Georg Herborg Enevoldsen, Nordborg (DK)

(73) Assignee: DANFOSS A/S, Nordborg (DK)

( * ) Notice: Subject to any disclaimer, the term of this patent is extended or adjusted under 35 U.S.C. 154(b) by 53 days.

(21) Appl. No.: 17/696,433

(22) Filed: Mar. 16, 2022

(65) Prior Publication Data
US 2022/0297064 A1 Sep. 22, 2022

(30) Foreign Application Priority Data
Mar. 17, 2021 (EP) ..................................... 21163048

(51) Int. Cl.
*B01D 61/06* (2006.01)
*B01D 61/02* (2006.01)
(Continued)

(52) U.S. Cl.
CPC ........... *B01D 61/06* (2013.01); *B01D 61/025* (2013.01); *B01D 61/026* (2022.08); *B01D 61/08* (2013.01);
(Continued)

(58) Field of Classification Search
CPC .............................. B01D 61/026; B01D 61/06; B01D 2313/246; B01D 2317/022
See application file for complete search history.

(56) References Cited

U.S. PATENT DOCUMENTS

| 5,096,574 A | 3/1992 | Birdsong et al. |
| 8,128,821 B2 | 3/2012 | Oklejas, Jr. |
| (Continued) | | |

FOREIGN PATENT DOCUMENTS

| CN | 1926333 A | 3/2007 |
| CN | 102138007 A | 7/2011 |
| (Continued) | | |

OTHER PUBLICATIONS

First Examination Report corresponding to Indian Patent Application No. 202214000391 dated Oct. 19, 2022.

*Primary Examiner* — Bradley R Spies
(74) *Attorney, Agent, or Firm* — McCormick, Paulding & Huber PLLC

(57) ABSTRACT

Reverse osmosis (1) system having a first membrane unit (2) and at least a second membrane unit (3), the membrane units (2, 3) forming a chain of membrane units, the first membrane unit (2) having a first membrane (4) separating a first feed chamber (5) and a first permeate chamber (6), a first inlet (7) connected to the first feed chamber (5), a first permeate outlet (9) connected to the first permeate chamber (6), and a first concentrate outlet (8) connected to the first feed chamber (5), the second membrane unit (3) having a second membrane (10) separating a second feed chamber (11) and a second permeate chamber (12), a second inlet (13) connected to the second feed chamber (11), a second permeate outlet (15) connected to the second permeate chamber (12), and a second concentrate outlet (14) connected to the second feed chamber (11), wherein the concentrate outlet (8) of a membrane unit (2) in the chain of membrane units is connected to an inlet (13) of a following membrane unit (3) and a concentrate outlet (14) of at least one membrane unit (3) downstream the first membrane unit (2) in the chain of membrane units is connected to a hydraulic motor (18). In such a system the energy consumption should be optimized.

(Continued)

To this end the hydraulic motor (18) is operatively connected to a first electric machine (21).

13 Claims, 3 Drawing Sheets

(51) Int. Cl.
    *B01D 61/08*     (2006.01)
    *B01D 61/12*     (2006.01)
    *B01D 61/58*     (2006.01)

(52) U.S. Cl.
    CPC ............. *B01D 61/12* (2013.01); *B01D 61/58* (2013.01); *B01D 2313/243* (2013.01); *B01D 2313/246* (2013.01); *B01D 2317/022* (2013.01)

(56) References Cited

U.S. PATENT DOCUMENTS

| | | | |
|---|---|---|---|
| 8,691,086 B2 | 4/2014 | Oklejas, Jr. | |
| 9,023,210 B2 | 5/2015 | Oklejas, Jr. | |
| 9,695,064 B2 | 7/2017 | Okeljas, Jr. | |
| 2007/0181473 A1 | 8/2007 | Manth et al. | |
| 2010/0313849 A1* | 12/2010 | Stoner | B60W 10/02 417/1 |
| 2013/0277310 A1 | 10/2013 | Oklejas, Jr. | |
| 2017/0066670 A1* | 3/2017 | El-Sayed | C02F 1/445 |
| 2018/0001264 A1* | 1/2018 | Song | B01D 65/08 |
| 2020/0239337 A1 | 7/2020 | Oklejas, Jr. | |
| 2022/0380233 A1* | 12/2022 | Stover | C02F 1/265 |

FOREIGN PATENT DOCUMENTS

| | | | |
|---|---|---|---|
| CN | 204512081 U | 7/2015 | |
| DE | 10 2011 116 864 A1 | 4/2013 | |
| DE | 102018106521 A1 | 9/2019 | |
| EP | 2 368 624 A1 | 9/2011 | |
| EP | 3 046 658 B1 | 4/2018 | |
| WO | WO-2013033841 A1 * | 3/2013 | ......... H01L 21/0237 |

* cited by examiner

REVERSE OSMOSIS SYSTEM

CROSS-REFERENCE TO RELATED APPLICATION

This application claims foreign priority benefits under 35 U.S.C. § 119 to European Patent Application No. 21163048.8 filed on Mar. 17, 2021, the content of which is hereby incorporated by reference in its entirety.

TECHNICAL FIELD

The present invention relates to a reverse osmosis system having a first membrane unit and at least a second membrane unit, the membrane units forming a chain of membrane units, the first membrane unit having a first membrane separating a first feed chamber and a first permeate chamber, a first inlet connected to the first feed chamber, a first permeate outlet connected to the first permeate chamber, and a first concentrate outlet connected to the first feed chamber, the second membrane unit having a second membrane separating a second feed chamber and a second permeate chamber, a second inlet connected to the second feed chamber, a second permeate outlet connected to the second permeate chamber, and a second concentrate outlet connected to the second feed chamber, wherein the concentrate outlet of a membrane unit in the chain of membrane units is connected to an inlet of a following membrane unit and a concentrate outlet of at least one membrane unit downstream the first membrane unit in the chain of membrane units is connected to a hydraulic motor.

BACKGROUND

Such a reverse osmosis system is known, for example, from U.S. Pat. No. 9,695,064 B2.

Such a reverse osmosis system is used, for example, for treating wastewater or for desalinating of sea water. To this end the liquid to be treated is fed under a certain pressure into the feed chamber of one membrane unit. The pressure is adjusted so that part of the fed liquid can penetrate the membrane to leave the membrane unit as permeate, for example as water having a reduced content of salt, whereas the remaining liquid comes out of the concentrate outlet and has, for example, a higher concentration of salt.

However, the liquid leaving the feed chamber via the concentrate outlet has still a rather high pressure. This pressure is only slightly reduced compared to the pressure at the inlet. In order not to waste the energy which was necessary to generate the high pressure, the liquid from the concentrate outlet can be fed into an inlet of a following membrane unit. Further membrane units can be used, for example three or four membrane units which are arranged one behind the other and wherein the inlet of a membrane unit is connected to the concentrate outlet of the preceding membrane unit. However, the liquid leaving the last membrane unit still has a rather high pressure.

It is known to use this pressure to drive a motor or a turbine which is coupled to a pump, so that the unit formed by the motor and the pump forms a kind of pressure exchanger which increases the pressure of a liquid which is fed to one of the upstream membrane units.

SUMMARY

The object underlying the invention is to optimize the energy consumption needed for the reverse osmosis process.

This object is solved with a reverse osmosis system in that the hydraulic motor is operatively connected to a first electric machine.

The hydraulic motor is driven by the liquid leaving the concentrate outlet and having a pressure which is high enough to drive the hydraulic motor. The hydraulic motor in turn is operatively connected to a first electric machine which can be operated as electric generator producing electric energy or which can be operated as electric motor acting on the hydraulic motor in order to control the flow of concentrate. The electric energy can be supplied to a grid or can be used for other purposes, for example to other units in the system, so that the energy stored in the liquid leaving the concentrate outlet is not wasted. Basically, the electric energy can be moved to where it is needed. The connection between hydraulic motor and first electric machine can be a direct connection or it can be a connection via a clutch or via a gear or via a gear and a clutch.

In an embodiment of the invention the first electric machine is electrically connected to at least a second electric machine operatively connected to a pump located in a flow path upstream of one of the membrane units. The electric energy produced by the first electric machine can be used directly in the reverse osmosis system to drive a second electric machine which in turn can be used to drive a pump. The pump can increase the pressure of the liquid which is supplied to one of the membrane units which are arranged upstream the membrane unit from which the liquid is taken out of the concentrate outlet.

In an embodiment of the invention the pump is a booster pump connected to the inlet of one of the membrane units downstream the first membrane unit. The liquid leaving the concentrate outlet of a membrane unit has still an elevated pressure, as mentioned above. However, in some cases this pressure is not sufficient to be used for the reverse osmosis system in a following membrane unit. Thus, the booster pump can be used to increase the pressure of the liquid leaving the concentrate outlet further so that the pressure of the liquid is high enough for the reverse osmosis process in the following membrane unit.

Alternatively or in addition, the pump is a supply pump connected to the first inlet. The supply pump can feed liquid into the inlet of the first membrane unit. The supply pump can be used to produce all the pressure which is needed for the reverse osmosis process in the first membrane unit. However, it is also possible to use the supply pump only as booster pump which is supplied with liquid having already a higher pressure which can be produced by a feed pump.

In an embodiment of the invention at least one of the electric machines is part of a variable frequency drive. The variable frequency drive can be used to adjust the frequency with which the respective electric machine is operated. Thus, the variable frequency drive can influence the frequency of the electric energy, which is outputted by the first electric machine, when the electric machine is operated as generator. Furthermore, the variable frequency drive can influence the frequency of the electric energy which is used to drive the second electric machine which in turn can be used to adjust the power of the second electric machine, for example to adjust a suitable pressure of the liquid pump by the pump driven by the second electric machine. Thus, it is possible to adapt the pressure to parameters which can change during operation of the reverse osmosis system. For example, the membrane can change its characteristics during lifetime so that a higher or a lower pressure is needed for the reverse osmosis system. Furthermore, the liquid to be treated can change, for example having a higher or lower content of salt.

In an embodiment of the invention the hydraulic motor is directly installed on the second concentrate outlet. Since it is no longer necessary to combine the motor and the pump in one unit, the motor can be in a position such that the liquid flowing from the concentrate outlet to the motor has the lowest pressure loss possible. In a preferred embodiment the hydraulic motor is directly mounted to the membrane unit.

In an embodiment of the invention the hydraulic motor is a first axial piston machine. An axial piston machine has a high efficiency, so that energy losses can be kept low.

In an embodiment of the invention at least one pump is a second axial piston machine. The pump can be, as mentioned above, a booster pump or a supply or feed pump. A pump of the axial piston type has also a rather high efficiency.

In an embodiment of the invention at least one of the axial piston machines forms a flow meter. The axial piston machines are the hydraulic motor and the at least one pump. The displacement of an axial piston machine during one rotation is known. It is therefore rather simple to generate a signal representing the flow of the liquid into the membrane unit or out of the concentrate outlet of the membrane unit by counting the number of rotations of the axial piston machine (or in any other way).

In an embodiment of the invention at least one of the axial piston machines comprises an inlet sensor and/or an outlet sensor. The sensors can detect, for example, the pressure of the liquid which passes the respective axial piston machine. The characteristic detected by the inlet sensor and/or the outlet sensor can be used to optimize the operation of the reverse osmosis system.

In an embodiment of the invention the at least one of the axial piston machines comprises an internal leak-flow sensor. When the internal leak-flow is known, the axial piston machine can be used as a flow meter measuring the flow into the membrane unit or out of the concentrate outlet of the membrane unit with an ultra-high accuracy.

In an embodiment of the invention at least a n-th membrane unit having a n-th membrane separating a n-th feed chamber and a n-th permeate chamber, a n-th inlet connected to the n-th feed chamber, a n-th permeate outlet connected to the n-th permeate chamber, and a n-th concentrate outlet connected to the n-th feed chamber is provided, wherein n is an integer greater than 2 and the n-th inlet is connected to the (n−1)-th concentrate outlet. In this way it is possible to form a multistage membrane system having more than two membrane units.

In an embodiment of the invention at least one of the n-th inlets is directly connected to the (n−1)-th concentrate outlet. In this case, there is no additional booster pump between the two membrane units which is in some cases sufficient. In an embodiment of the invention at least one of the (n−1)-th concentrate outlets is connected to a hydraulic motor operatively connected to a first electric machine and to a hydraulic pump operatively connected to a second electric machine. This means, that not only the second membrane unit can be provided with a hydraulic motor at the concentrate outlet, but also membrane units which are located at a later stage downstream can be provided with a motor at the concentrate outlet.

It should be mentioned that the membrane units described above can have more than a single membrane, wherein the membranes are arranged in parallel.

The system has advantages. In a system, where the flow and the pressure is insufficient energy in the generator mode, the drive changes into motor mode, so that the flow through the generator drive can be maintained.

The system enables a variable and individual control of the recovery rate of a membrane. A variable control of i.e. the recovery rate can increase the service life of a membrane, optimize the energy consumption needed for the reverse osmosis process and adjust the system to operate with different kind of fluids. This can be of benefit when there a changes in the composition of the fluid, for example sea water or waste water, entering the membrane units.

BRIEF DESCRIPTION OF THE DRAWINGS

Preferred embodiments of the invention will now be described in more detail with reference to the drawing, wherein.

DETAILED DESCRIPTION

Figure 1:
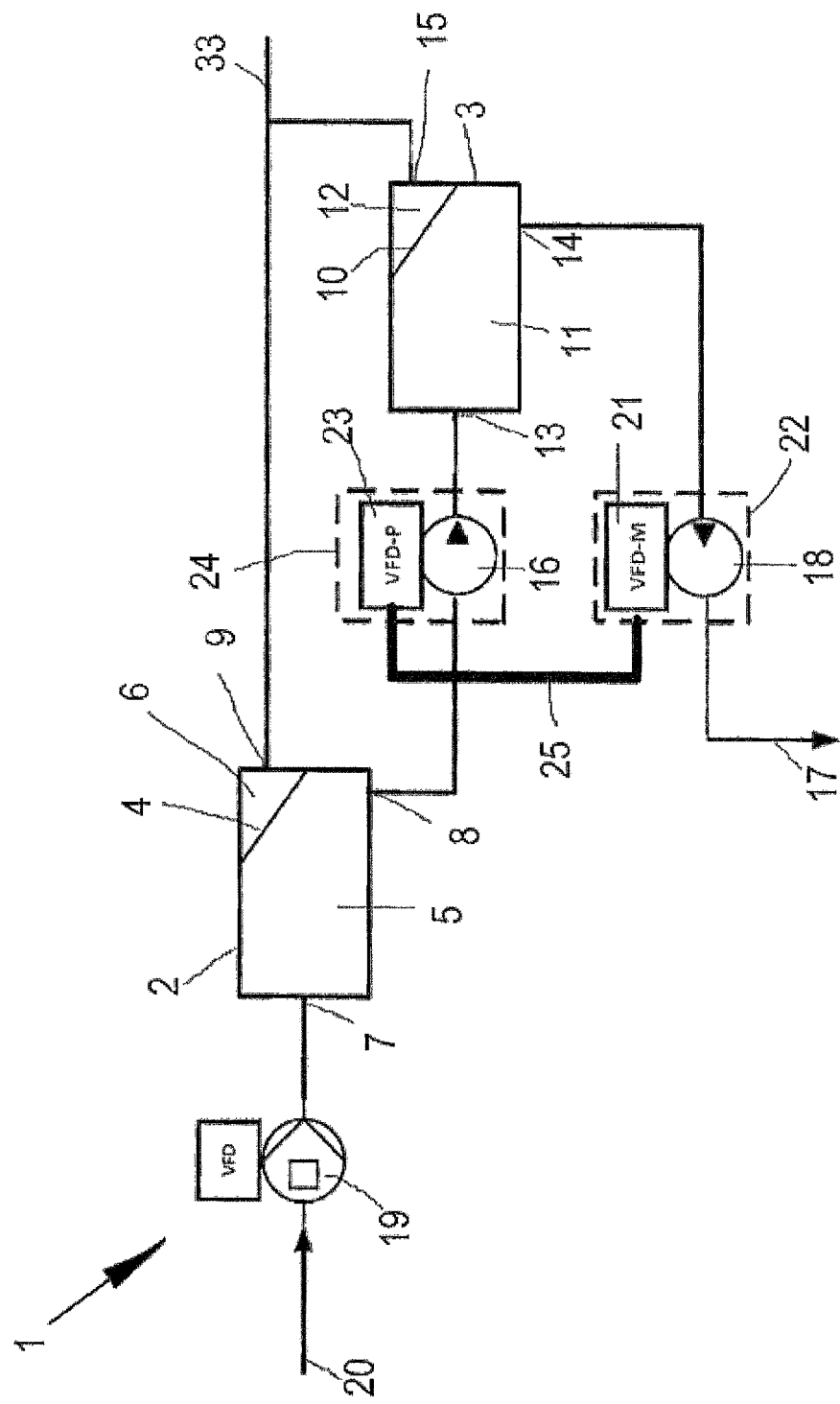
FIG. 1 shows a first embodiment of a reverse osmosis system.

In all Fig. the same or similar elements are denoted with the same reference numerals.

FIG. 1 shows schematically a reverse osmosis system 1 having a first membrane unit 2 and a second membrane unit 3. The first membrane unit comprises a first membrane 4 separating a first feed chamber 5 and a first permeate chamber 6. The first feed chamber 5 is provided with a first inlet 7 and with a first concentrate outlet 8. The permeate chamber 6 is provided with a permeate outlet 9.

The second membrane unit 3 comprises a second membrane 10 separating a second feed chamber 11 and a second permeate chamber 12. The second feed chamber 11 comprises a second inlet 13 and a second concentrate outlet 14. The second permeate chamber 12 comprises a second permeate outlet 15.

The membranes 4, 10 are shown schematically only. It should be noted that the membranes 4, 10 can be in form of membrane arrays or other arrangement of membranes.

The second inlet 13 is connected to the first concentrate outlet 8 by means of a booster pump 16. The second concentrate outlet 14 is connected to a system outlet 17 by means of a hydraulic motor 18.

The first inlet 7 is connected to a feed pump 19 which pumps a liquid, for example sea water, from a system inlet 20 into the first inlet 7.

The hydraulic motor 18 is in form of an axial piston motor which is operatively connected to a first electric machine 21. The assembly of hydraulic motor 18 and first electric machine 21 is briefly termed generator drive 22. The generator drive 22 is a variable frequency drive, i.e. the first electric machine 21 produces electric energy in form of currents and voltages the frequency of which can be adjusted.

The booster pump 16 is also of the axial piston type and is driven by a second electric machine 23. The unit of booster pump 16 and second electric machine 23 can be briefly termed pump drive 24. The pump drive 24 can also be in form of a variable frequency drive, so that the booster pump 16 can be operated with varying speeds and thus with varying pressures and/or flows.

The electric energy needed for operating the pump drive 24 is produced by the generator drive 22. Thus, an electric line 25 is used to connect the generator drive 22 and the pump drive 24.

The generator drive 22 is an energy recovery unit design based on the positive displacement hydraulic motor 18 in form of an axial piston motor connected to the first electric machine 21 which is able to operate in all four quadrants (motor left/right and generator left/right operation).

The generator drive 22 can be operated in a motor or in a generator mode. The generator drive 22 can transfer the generated electrical energy operating in generator mode to other drives, for example to the pump drive 24, via the line 25 which can be in form of a DC bus or the variable frequency drive can modulate the internal DC voltage to an AC voltage on its inlet terminals thus feeding the generated energy to the electrical grid.

The generator drive 22 can actively control the recovery rate of the reverse osmosis system 1 and at the same time recuperate energy from the fluid stream passing through the motor 18.

Although it is shown in FIG. 1 that the generator drive has a certain distance to the second membrane unit 3, the real distance between the generator drive 22 and the second concentrate outlet 14 should be as short as possible to avoid pressure losses of the fluid. In a preferred embodiment, the generator drive 22 is directly mounted on the second membrane unit 3.

Since the generator drive and the pump drive are separated from each other, they are independent components which give a greater flexibility in relation to where install the components which, for example, could be directly on the second concentrate outlet 14 thus eliminating pressure losses etc.

An axial piston machine has a known displacement. Thus, the volume of fluid pumped or consumed during each rotation of the axial piston machine is known. This gives the possibility to fine tune flows and pressures across individual membranes 4, 10 in the multistage membrane application in the reverse osmosis system 1. This means that changes can be accepted. For example, individual membranes 4, 10 in the reverse osmosis system change character due to cleaning or replacement or to aging. The fluid changes character, i.e. in waste-water cleaning plants or in sea waste desalination.

The high total efficiency of axial piston machines when used as pumps and when used as motors or turbines guarantee a high efficiency. The similar design concept enables sharing of wear and spear parts that makes ongoing service simpler. When high pressure axial piston pumps are used, they can be used as accurate high flow flow-meters. This will simplify the control system of the multistage reverse osmosis system 1.

Furthermore, the generator drive 22 and/or the pump drive 24 may have built in inlet and/or outlet sensors, which further simplifies the system designs and controls set-up. All sensor inputs needed to control the reverse osmosis system 1 are available from the generator drive 22 and the pump drive 24.

Furthermore, the generator drive 22 and/or the pump drive 24 can be provided with internal leak-flow sensors to enable accurate flow measurements in all pipelines of the system, including the permeate flow. Inlet and outlet sensors on all hydraulic machines provide all membrane input/output pressures. Total power consumption can be optimized.

It should be noted, that in many cases it is sufficient to use the mentioned sensors only in part, so that not all sensors must be present in all elements of the reverse osmosis system.

Figure 2:
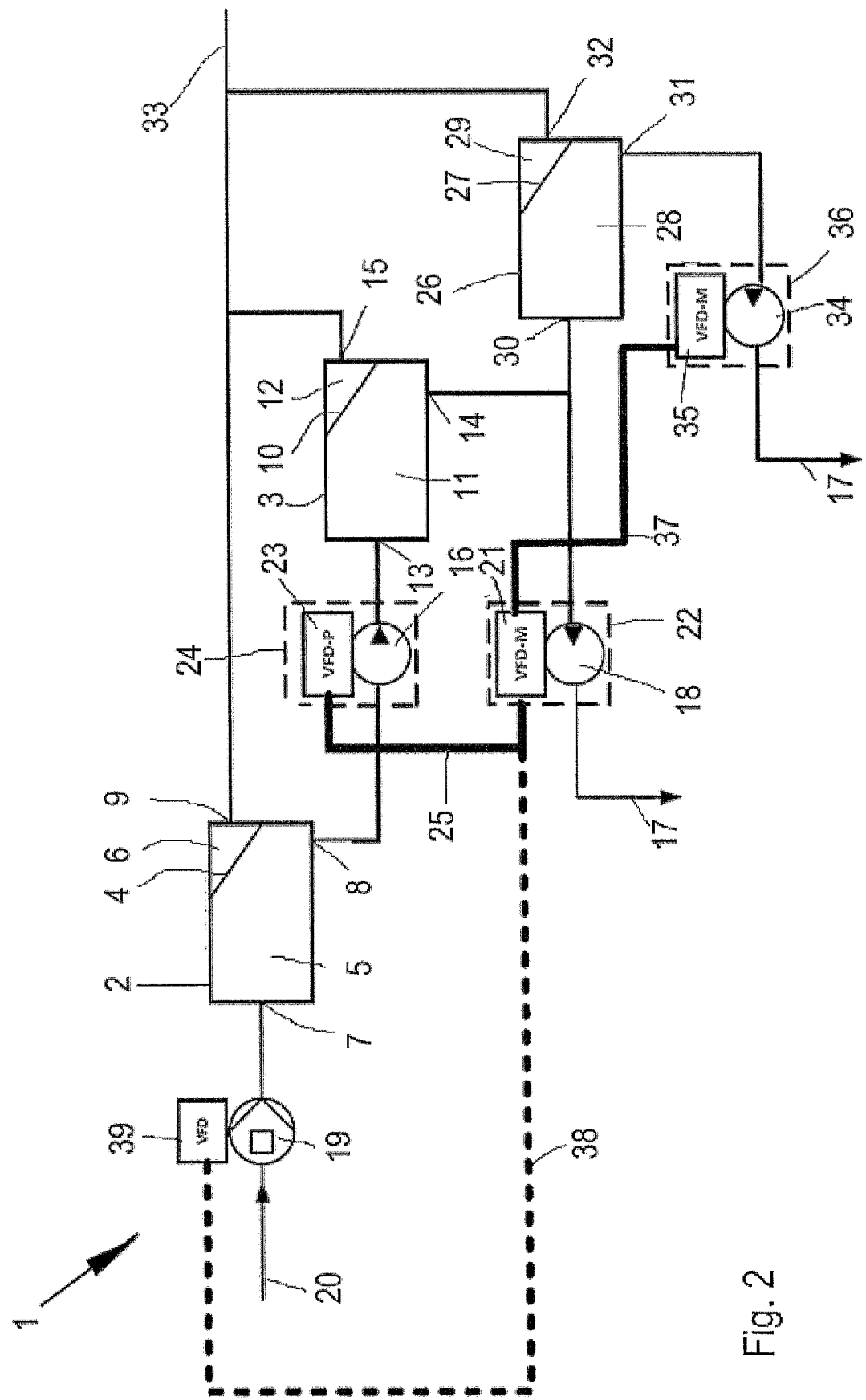
FIG. 2 shows a second embodiment of a reverse osmosis system.

FIG. 2 shows a second embodiment of a reverse osmosis system having three stages. In other words, a third membrane unit 26 has been added. The third membrane unit 26 comprises a third membrane 27 separating a third feed chamber 28 from a third permeate chamber 29. The third feed chamber 28 comprises a third inlet 30 and a third concentrate outlet 31. The third permeate chamber 27 comprises a third permeate outlet 32.

Like in the embodiment of FIG. 1, where the two permeate outlets 9, 15 are connected to produce a combined permeate flow 33, the permeate outlets 9, 15, 32 of the three membrane units 2, 3, 26 are connected to form a combined permeate flow 33.

The second concentrate outlet 14 is connected to the generator drive 22, as in FIG. 1, and in addition connected to the third inlet 30, so that part of the concentrate outputted by the second membrane unit 3 is fed to the third membrane unit 26. By controlling the generator drive 22, more precisely by controlling the variable frequency of the generator drive 22, it is possible to control which part of the flow out of the second outlet 14 flows through the third membrane unit 26.

The third concentrate outlet 31 is connected to a third hydraulic machine 34 in form of an axial piston motor which is operatively connected to a third electric machine 35. The motor 34 and the third electric machine 35 form a second generator drive 36.

The third electric machine 35 is connected via a line 37, for example in form of a variable frequency drive bus or a DC bus to the first electric machine 21 of the generator drive 22. As in FIG. 1, the first electric machine 21 of the generator drive 22 is connected to the second electric machine 23 of the pump drive 24.

All electric machines 21, 23, 35 can be in form of variable frequency drives.

Furthermore, another connection in form of a variable frequency drive bus or DC bus 38 is provided connecting the generator drive 22 to a further electric machine in form of a variable frequency drive 39 controlling the supply pump 19 at the first inlet 7.

Figure 3:
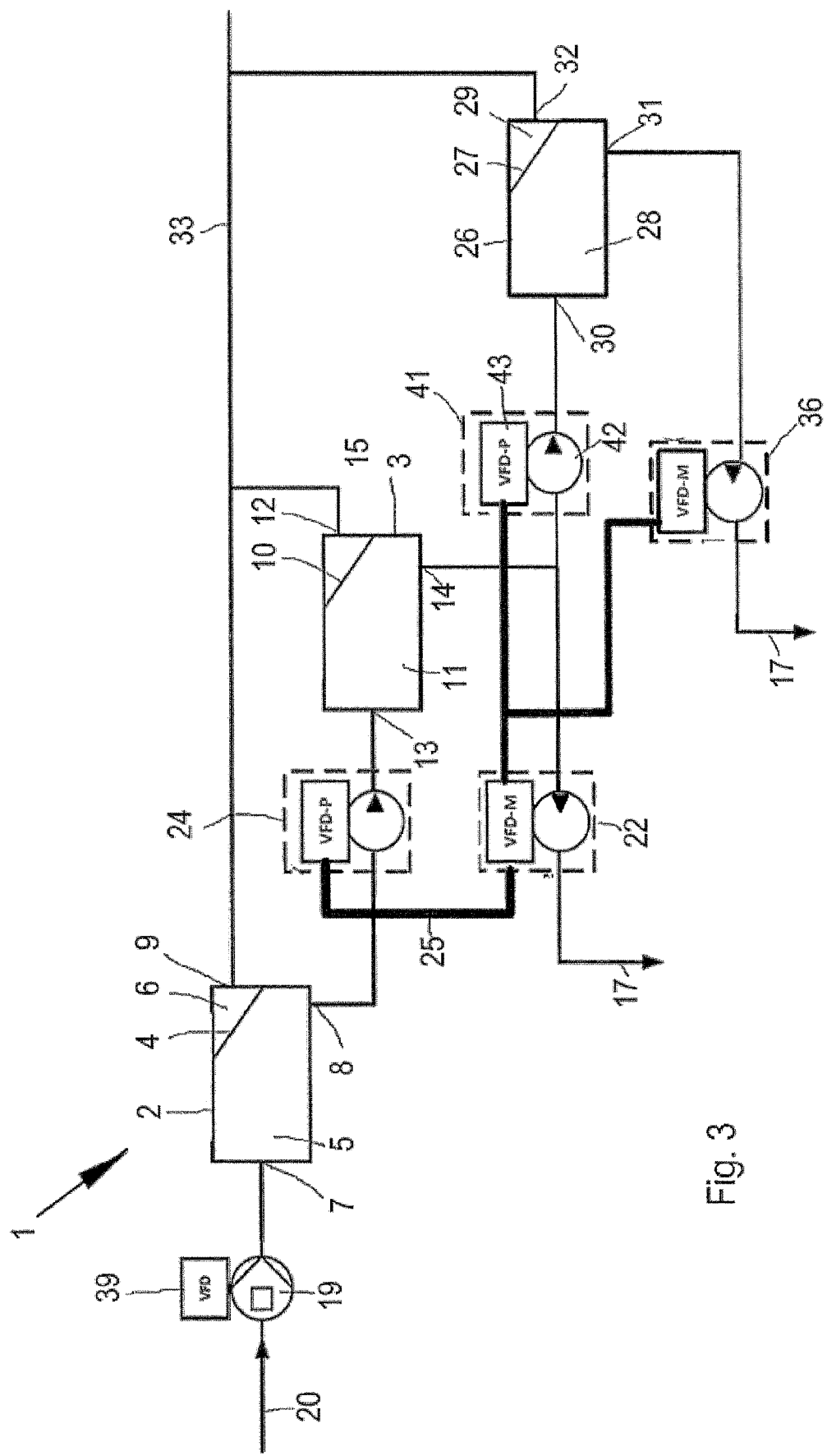
FIG. 3 shows a third embodiment of a reverse osmosis system.

FIG. 3 shows a third embodiment of the reverse osmosis system 1 which comprises in addition to the embodiment shown in FIG. 2 a further pump drive 41 located between the second concentrate outlet 14 and the third inlet 30. The pump drive 41 comprises a pump 42 in form of an axial piston machine and a fourth electric machine in form of a variable frequency drive 43, so that it is possible to control exactly the flow supplied to the third membrane unit 26.

All hydraulic machines in form of motors or pumps shown in FIGS. 2 and 3 can have the same sensor described in connection with the embodiment of FIG. 1.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A reverse osmosis system having a first reverse osmosis membrane unit and at least a second reverse osmosis membrane unit, the reverse osmosis membrane units forming a chain of reverse osmosis membrane units, the first reverse osmosis membrane unit having a first reverse osmosis membrane separating a first feed chamber and a first permeate chamber, a first inlet connected to the first feed chamber, a first permeate outlet connected to the first permeate chamber, and a first concentrate outlet connected to the first feed chamber, the second reverse osmosis membrane unit having a second reverse osmosis membrane separating a second feed chamber and a second permeate chamber, a second inlet connected to the second feed chamber, a second permeate outlet connected to the second permeate chamber, and a second concentrate outlet connected to the second feed chamber, wherein the concentrate outlet of a reverse osmosis membrane unit in the chain of reverse osmosis membrane units is connected to an inlet of a following reverse osmosis membrane unit and a concentrate outlet of at least one reverse osmosis membrane unit downstream the first reverse osmosis membrane unit in the chain of reverse osmosis membrane units is connected to a hydraulic motor, wherein the hydraulic motor is operatively connected to a first electric machine to form a generator drive, wherein the first electric machine is electrically connected to at least a second electric machine operatively connected to a pump to form a pump drive located in a flow path upstream of one of the membrane units, wherein the generator drive and the pump drive are separate, independent components, and wherein the generator drive is directly installed on the second concentrate outlet.

2. The reverse osmosis system according to claim 1, wherein the pump is a booster pump connected to the inlet of one of the membrane units downstream the first membrane unit.

3. The reverse osmosis system according to claim 1, the pump is a supply pump connected to the first inlet.

4. The reverse osmosis system according to claim 1, wherein at least one of the electric machines is part of a variable frequency drive.

5. The reverse osmosis system according to claim 1, wherein the hydraulic motor is a first axial piston machine.

6. The reverse osmosis system according to claim 1, wherein at least one pump is a second axial piston machine.

7. The reverse osmosis system according to claim 5, wherein at least one of the axial piston machines forms a flow meter.

8. The reverse osmosis system according to claim 5, wherein at least one of the axial piston machines comprises an inlet sensor and/or an outlet sensor.

9. The reverse osmosis system according to claim 5, wherein at least one of the axial piston machines comprises an internal leak-flow sensor.

10. The reverse osmosis system according to claim 1, wherein at least a n-th membrane unit having a n-th membrane separating a n-th feed chamber and a n-th permeate chamber, a n-th inlet connected to the n-th feed chamber, a n-th permeate outlet connected to the n-th permeate chamber, and a n-th concentrate outlet connected to the n-th feed chamber is provided, wherein n is an integer greater than 2 and the n-th inlet is connected to the (n−1)-th concentrate outlet.

11. The reverse osmosis system according to claim 10, wherein at least one of the n-th inlets is directly connected to the (n−1)-th concentrate outlet.

12. The reverse osmosis system according to claim 10, wherein at least one of the (n−1)-th concentrate outlet is connected to a hydraulic motor operatively connected to a first electric machine and to a hydraulic pump operatively connected to a second electric machine.

13. The reverse osmosis system according to claim 2, wherein at least one of the electric machines is part of a variable frequency drive.

* * * * *